United States Patent [19]

Schuetz

[11] Patent Number: 5,311,027

[45] Date of Patent: May 10, 1994

[54] APPARATUS AND METHOD FOR UNIFORMLY IRRADIATING A STRAND

[75] Inventor: Marlin N. Schuetz, Raleigh, N.C.

[73] Assignee: Raychem Corporation, Menlo Park, Calif.

[21] Appl. No.: 23,550

[22] Filed: Feb. 26, 1993

[51] Int. Cl.[5] ............................................. H01J 37/00
[52] U.S. Cl. .............................. 250/492.3; 250/453.11
[58] Field of Search ................. 250/492.3, 453.11, 398, 250/400

[56] References Cited

U.S. PATENT DOCUMENTS 4,226,687 10/1980 Sasaki et al. .................... 250/492.3
5,051,600 9/1991 Schuetz et al. .................. 250/492.3

Primary Examiner—Paul M. Dzierzynski
Assistant Examiner—Kiet T. Nguyen
Attorney, Agent, or Firm—Herbert G. Burkard; William D. Zahrt II; A. Stephen Zavell

[57] ABSTRACT

An apparatus and method for uniformly irradiating a strand of plastic material by twisting the strand as it is advanced in a plurality of paths transverse to an electron beam. A set of pinch rolls are positioned on opposites ends of the electron beam generator to advance and twist the strand. Lift cams periodically release the twist on the strand at positions of maximum twist by forcing the pinch rolls apart. Each set of pinch rolls includes upper and lower rolls adjacent a medial roll which, in turn, is driven in alternating axial directions to impart twist to the strand. The medial rolls are driven in alternating axial directions by a cammed surface thereon and a cam follower and synchronized to move 180° out of phase from each other. A series of three spaced apart idler rolls are also provided to form a tandem figure-eight pattern in side view for the strand to compensate for reel set in the strand.

55 Claims, 4 Drawing Sheets

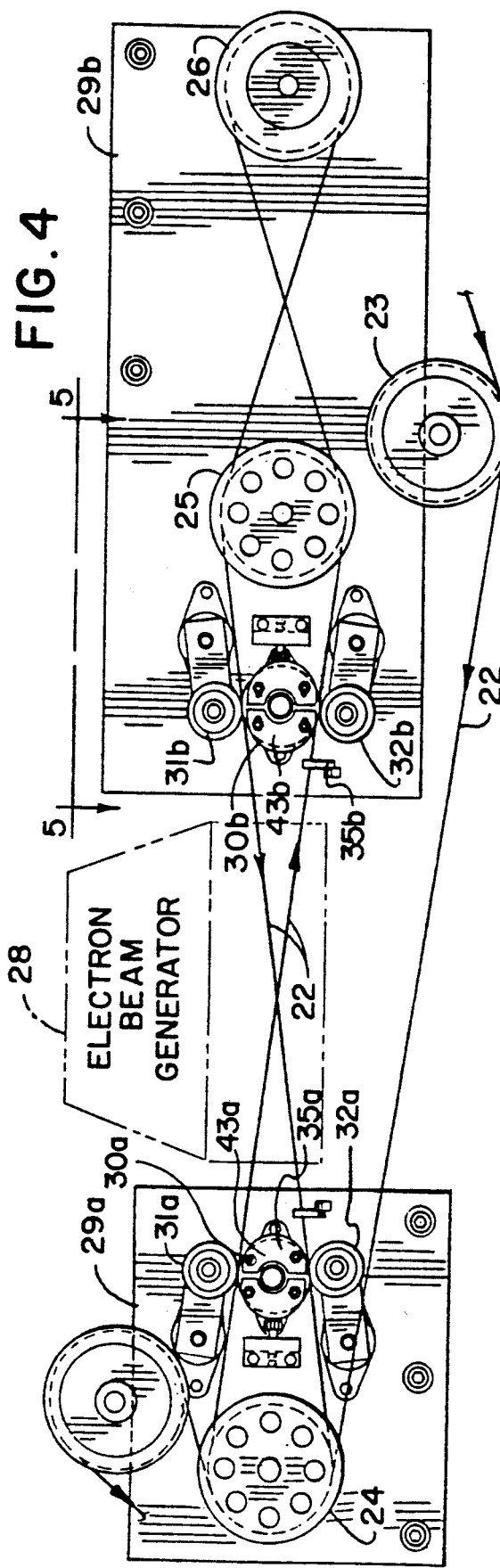
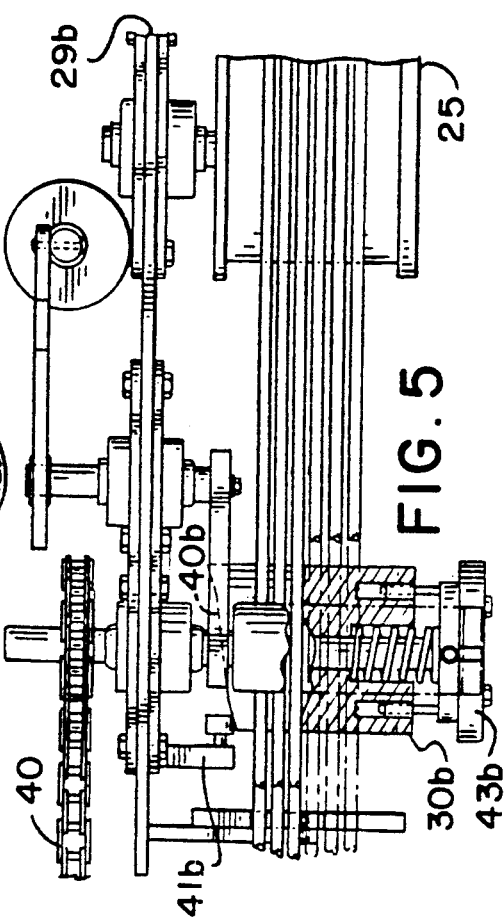
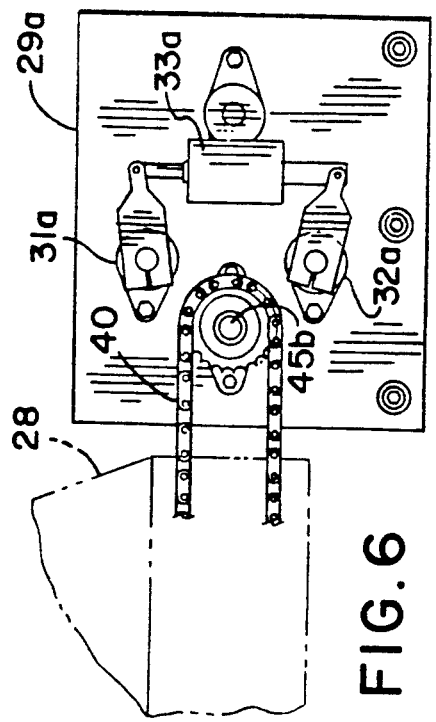

DISPLACEMENT

APPARATUS AND METHOD FOR UNIFORMLY IRRADIATING A STRAND

FIELD OF THE INVENTION

This invention relates to the field of treating plastic materials, such as with a radiation beam, and more particularly, to an apparatus and method for twisting a strand of plastic material to enhance the uniformity of radiation dosage imparted to the strand.

BACKGROUND OF THE INVENTION

For certain applications, it is often desirable to irradiate a plastic material, such as with a high-energy electron beam, to cause material changes in the plastic. For example, it is known that the cross-linking of polymer plastic material is promoted through irradiation of the material by an electron beam. The electron beam must be of high enough energy and intensity so that a sufficient quantity of electrons penetrate to a sufficient depth into the material to provide the desired radiation dosage.

Providing a controlled radiation dosage radially into a strand or tube has resulted in advantageous material properties. A special case example requiring highly controlled radial beam dosage is the radially differentially cross-linked polymer tubing of the type described in commonly assigned U.S. Pat. No. 3,455,337. The differentially cross-linked polymer in tubular form, such as for heat shrink tubing applications, includes a fusible noncross-linked inner concentric portion that may be used to seal an underlying electrical connection, while the outer cross-linked concentric portion acts as a conventional heat shrink tubing.

Providing a circumferentially uniform dosage of radiation to a strand is relatively difficult to achieve. In one approach, an electron beam of sufficient energy has been passed through the entire cross-sectional dimension of material which was advanced in a single pass through the electron beam. Unfortunately, for a typical application for irradiating a plastic strand to manufacture heat shrink tubing, the required radiation source must be capable of generating an electron beam of a million electron volts or more. Accordingly, such an apparatus is very large, and must be contained within an extensively shielded enclosure to protect against potentially hazardous radiation exposure.

Another single pass approach to irradiating a strand, known as the "torroid" approach, used a torroidal vacuum chamber and circular electron gun to emit a beam around 360°. This approach, however, has not proven to be commercially practical or successful. Another variation similar to the torroid approach is to use three electron guns disposed about a coaxial window with 120° displacement between adjacent guns. This approach has also proven to be commercially impractical.

U.S. Pat. No. 5,051,600, assigned to the assignee of the present invention, discloses an apparatus for more uniformly irradiating an advancing strand in a single pass. The apparatus includes two opposing electron beam generators and respective deflector magnets and convergence magnets for causing relatively uniform radiation of the strand.

Another prior approach for irradiating plastic strands involves multiple passes of the strand in the path of the electron beam. The strand is manually threaded from a feed reel about sets of idler rolls in multiple loops and thus exposed in multiple loops to a scanned high energy electron beam. The amount and uniformity of irradiation has depended upon the scan rate of the beam and the advancement rate of the strand. The degree of uniformity of this approach is hampered because the strand often takes a particular set (reel set) when wound on a storage reel after extrusion. This reel set is maintained in the strand during the irradiation process thereby producing poor uniformity. Some improvement in uniformity for the multiple pass approach has been achieved by providing a magnet beneath the strand loops to reverse the direction of some portion of the electrons and theoretically return them to the sides of the loops for greater uniformity.

Despite numerous attempts to obtain a circumferentially uniformly irradiated strand, there still exists a need for an apparatus and method which overcome the limitations and drawbacks of the prior art.

SUMMARY OF THE INVENTION

In view of the foregoing background, it is therefore an object of the present invention to provide a method and apparatus for irradiating a strand of plastic material with a consistent and uniform circumferential dose of radiation, such as to cause a desired change in material property.

It is yet another object of the invention to provide a method and apparatus for irradiating a strand of plastic material preferably using a single radiation generator and efficiently utilizing the radiation produced therefrom to increase the overall process energy efficiency.

These and other objects, advantages and features of the present invention are provided by an irradiating apparatus including a radiation beam generator and strand advancing means for advancing a strand of material along a predetermined path of travel transverse to the radiation beam. More particularly, the strand advancing means includes twister means for twisting the advancing strand in alternating first and second opposite rotational directions as the strand is exposed to the radiation beam. Thus, the circumferential dose uniformity of the irradiated strand of material is greatly enhanced.

As would be readily understood by those skilled in the art, the irradiating apparatus according to the invention may be used for irradiating materials such as small diameter wire and cable insulation, plastic tubes, filaments, strands and the like (generally referred to herein as "strand" or "strand of material"). As would also be understood by those skilled in the art the radiation beam may include charged particles, such as $\beta$ or particles; neutral particles, such as neutrons; or electromagnetic radiation, such as ultraviolet radiation.

The radiation beam generator is preferably an electron beam generator including scanning means associated therewith for scanning the electron beam over a portion of the strand as the strand is advanced along its predetermined path of travel. As would be readily understood by those skilled in the art, the radiation beam may be a ribbon beam extending across the strand and scanned longitudinally with the strand.

The strand advancing means preferably includes a pair of pinch rolls for engaging the strand of material, and drive means operatively connected to one of the pinch rolls for advancing the strand of material along the predetermined path of travel. In one embodiment of the invention, the strand advancing means includes first and second sets of pinch rolls on opposite sides of the radiation beam generator. Each set of pinch rolls includes a medial roll, and upper and lower pressure rolls adjacent the medial roll thereby defining respective upper and lower pinch point areas for engaging the strand.

The strand advancing means preferably includes guide means for guiding the advancing strand of material in a plurality of predetermined paths transverse to the radiation beam. In other words, the strand of material is guided in multiple passes back and forth in the radiation beam to thereby increase the beam capture efficiency of the apparatus and to ensure uniform exposure. The strand advancing means preferably includes three spaced apart idler rolls defining a tandem figure-eight pattern in side view for the strand of material. The three idler rolls permit the apparatus according to the invention to produce a uniformly irradiated strand of material despite the presence of reel set in the strand.

The twister means preferably includes oscillating means for moving the medial roll relative to the upper and lower pressure rolls in alternating first and second opposite axial directions to thereby impart twist to the strand engaged at the pinch point areas. Preferably, the twister means twists the strand in substantially equal alternating first and second opposite rotational directions so that no net twist is imparted to the strand.

The twister means also preferably includes twist release means for periodically releasing twist on the strand. The twist release means preferably includes a lift cam connected to the medial roll for periodically forcing the upper and lower pressure rolls further apart from the medial roll. Preferably the twist is released at the points of maximum twist excursion. Accordingly, skid accumulation, slack accumulation and the overall amount of strand twist is improved by periodically releasing the twist. In addition, releasing the twist at the maximum excursions prevents the strand from being at these positions for an extended period which might cause nonuniform irradiation.

The method according to the present invention preferably includes the steps of generating a radiation beam and advancing a strand along a predetermined path of travel transverse to the radiation beam while twisting the advancing strand of material in alternating first and second opposite rotational directions. The twisting is preferably performed in substantially equal opposite rotational amounts thereby imparting no net twist to the strand. Thus, the strand of material is exposed to the radiation beam while being twisted to thereby increase the circumferential dose uniformity of the strand of material.

By controlling the radiation dosage, a strand may be produced having circumferentially uniform and radially differentially irradiated cross-sectional portions. Such a strand is described in U.S. Pat. No. 3,455,337, assigned to the assignee of the present invention. For example, the strand may include an outer concentric portion more highly irradiated than the inner concentric portion so that the outer concentric portion serves as conventional heat shrink tubing, while the inner concentric portion provides a source of fusible sealing material.

As noted above with respect to the apparatus according to the present invention, the method preferably includes the step of periodically releasing twist on the strand of material. The twist is preferably released at respective maximum twist excursions of the strand between opposite rotational directions.

The strand of material is preferably guided in a plurality of side-by-side predetermined paths transverse to the radiation beam and guided over three spaced apart idler rolls defining a tandem figure-eight pattern in side view to thereby compensate for any reel set in the strand of material.

BRIEF DESCRIPTION OF THE DRAWINGS

FIG. 4 is a side elevational view of an irradiating apparatus according to the present invention.

FIG. 5 is a greatly enlarged plan view of a portion of the irradiating apparatus as shown along lines 5—5 of FIG. 4.

FIG. 6 is a side elevational view of a rear side portion of the irradiating apparatus as shown in FIG. 5.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicant provides these embodiments so that this disclosure will be thorough and complete, and will fully convey the scope of the invention to those skilled in the art. Like numbers refer to like elements throughout.

Figures 1, 2, 3:
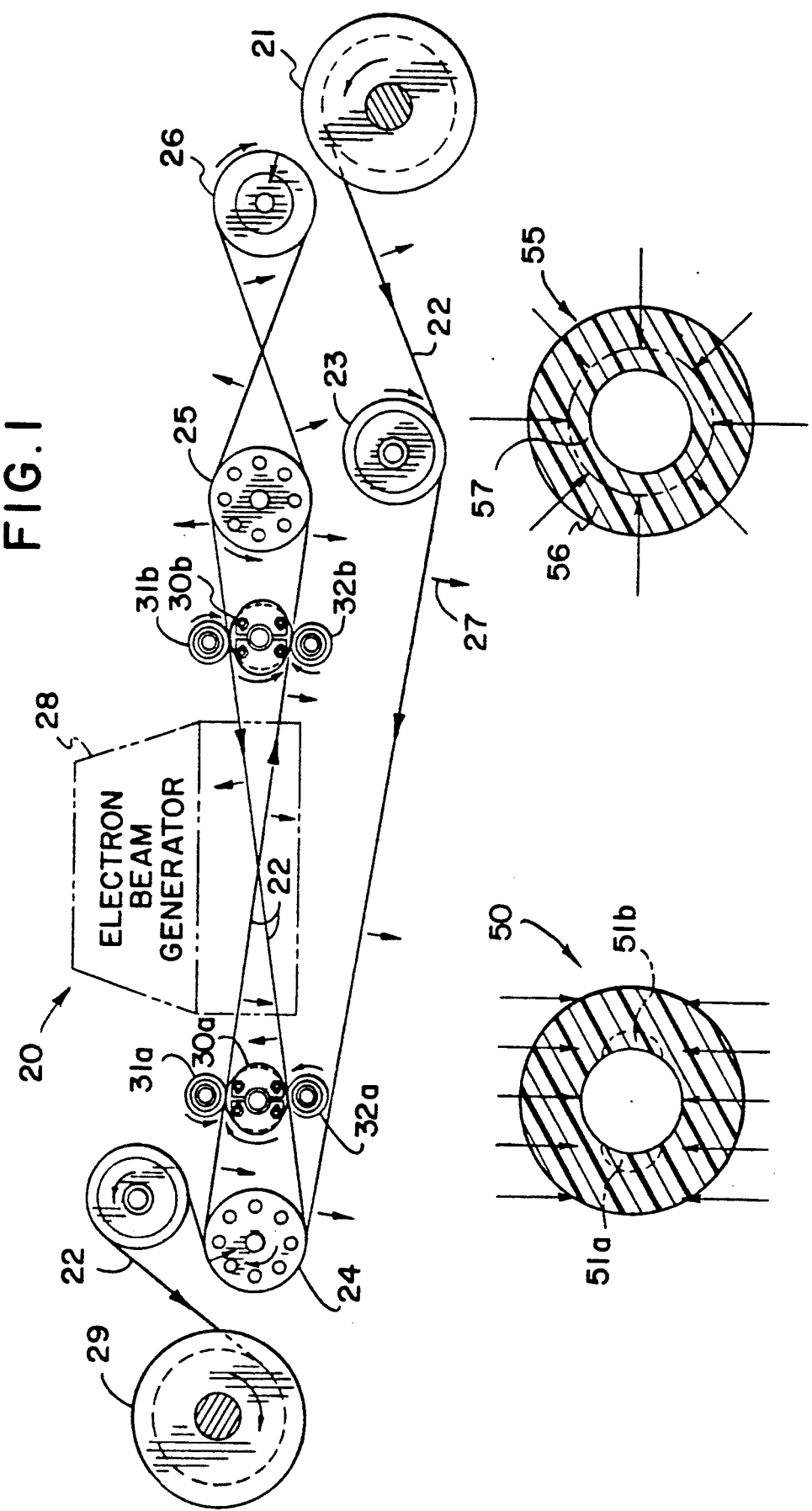
FIG. 1 is a schematic side elevational view of an irradiating apparatus according to the invention.
FIG. 2 is a schematic cross-sectional diagram of a strand exposed to a circumferentially nonuniform radiation dosage as in the prior art.
FIG. 3 is a schematic cross-sectional diagram of a strand having a radially differential radiation dosage as in the prior art and as may be readily produced using the apparatus and method according to the present invention.

Referring now to the schematic diagram of FIG. 1, the basic operation of the irradiating apparatus 20 according to the invention is best understood. A strand 22 of material, such as plastic tubing having a relatively small cross-sectional diameter, is payed off from a first storage reel 21, or other conventional payout means, over a guide sheave 23 to the first of a series of three idler rolls 24, 25 and 26 which form a tandem figure-eight pattern for the advancing strand 22 in side view.

The three spaced apart idler rolls 24, 25 and 26 provide guide means for the strand 22 so that multiple passes of the advancing strand 22 are irradiated. In addition, the figure-eight pattern increases circumferential dose uniformity of the strand 22 by removing the undesirable effects of reel set as typically formed in a plastic strand that is wound on a storage reel after extrusion.

For example, as indicated by the arrows 27 in FIG. 1, a typical strand 22 having reel set includes a surface portion, the inner surface from the wound reel, which is shorter than an opposing or outer surface portion. This shorter surface portion is facing downward as shown by the arrows 27 in FIG. 1 until the strand 22 passes over the first idler roll 24. The reel set causes the strand 22 to rotate in passing over the first idler roll 24 so that the shorter surface portion 27 is facing downward through the area exposed to the radiation beam as shown by the arrows 27. As illustrated by the arrows 27 downstream from the first idler roll 27, the strand 22 returns through the scanned area with the shorter side facing upward as illustrated by the arrows 27, thus producing uniform irradiation to a strand 22 despite the presence of reel set. Accordingly, the tandem figure-eight pattern for the advancing strand 22 provided by the three idler rolls 24, 25 and 26 effectively compensates for the presence of reel set in the strand.

As shown in the illustrated embodiment, the strand 22 is passed in a plurality of side-by-side paths transverse to a scanned electron beam from a conventional electron beam generator 28 and to a take-up reel 29, or other conventional take-up means. The electron beam generator 28 may have a relatively low energy on the order of several hundred thousand electron volts because the electron beam is efficiently utilized according to the present invention. For a conventional irradiating apparatus, wherein a strand is advanced through a radiation beam without twisting, the electron energy must be considerably higher, on the order of at least a million electron volts or more, to achieve penetration of the entire cross-sectional area of the strand.

Strand advancing means for the irradiating apparatus 20 is provided by two sets of pinch rolls. In the illustrated embodiment, a first set of pinch rolls 30a, 31a, 32a is positioned on the left hand portion of the supporting frame 29a (FIG. 4). The first set of pinch rolls includes a medial roll 30a and an upper and a lower pressure roll, 31a, 32a respectively, both adjacent to the medial roll and defining upper and lower pinch point areas for engaging the strand 22. Similarly, a second set of pinch rolls 30b, 31b, 32b is positioned on the right hand portion of the supporting frame 29b (FIG. 4). The medial roll 30a, 30b of each set of pinch rolls is driven by drive means including preferably an electric motor, not shown, coupled to the rolls by conventional gear or chain drive couplings as would be readily understood by those skilled in the art.

The strand advancing means of the irradiating apparatus 20 includes twister means for twisting the advancing strand 22 in alternating first and second opposite rotational direction, that is, clockwise and counterclockwise, as the strand is exposed to the electron beam from the electron beam generator 28. Preferably, the twister means twists the advancing strand 22 in substantially equal rotational amounts so that no net twist is imparted to the strand.

Referring to FIGS. 2 and 3, two irradiated strands 50 and 55 according to the prior art are described to highlight the apparatus and method according to the present invention. FIG. 2 shows a strand 50 with two opposite interior portions 51a, 51b having received an insufficient amount of radiation due to the chord length of the strand. These insufficiently radiated portions 51a, 51b are produced when a nonuniform dose of radiation is applied to the top and bottom portions only of the strand. These insufficiently irradiated portions 51a, 51b have physical characteristics different than surrounding portions of the strand 50 and, hence, are likely to fail or blow-out when the strand is expanded as during the manufacture of heat shrink tubing. The greater uniformity of irradiation achieved by the present invention produces uniform physical characteristics and, hence, overcomes this shortcoming of the prior art.

FIG. 3 shows a strand 55 according to the prior art as described in U.S. Pat. No. 3,455,337, assigned to the assignee of the present invention, having a differentially irradiated cross-section. The outer concentric portion 56 of the strand 55 is more highly irradiated than the inner concentric portion 57. While the outer concentric portion 56 of the strand 55 serves as conventional heat shrink tubing, the inner concentric portion 57 provides a source of fusible sealing material. The apparatus and method according to the present invention may be readily used to form the differentially irradiated strand 55 as shown and with high circumferential dosage uniformity. The radial depth of penetration of the radiation into the strand may be controlled to produce the radially differentially irradiated strand 55.

Referring now to FIGS. 4-8, the illustrated embodiment of the twister means according to the invention is best understood. Twisting of the advancing strand is achieved by the medial roll 30a, 30b of each set of rolls being driven in alternating first and second axial directions relative to the respective upper pressure roll 31a, 31b and lower pressure roll 32a, 32b. As shown in FIG. 6, the upper and lower pinch rolls 31a32a are biased against the medial roll by a pressurized air cylinder 33a. The upper and lower pinch rolls define upper and lower strand pinch areas with the medial roll. To assist in maintaining spacing between adjacent passes of the strand, comb-like guides 35a, 35b are provided adjacent each set of pinch rolls and each of the guides include a series of channels 36a, 36b, respectively, formed therein.

Figure 7:
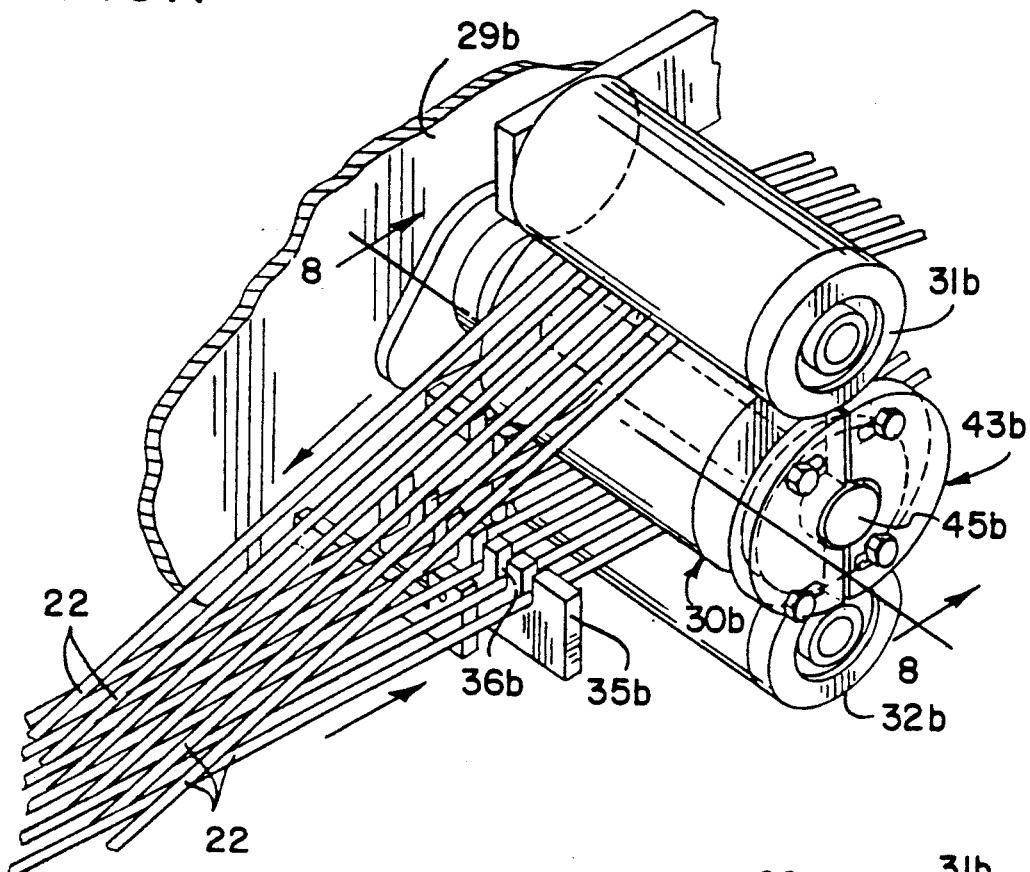
FIG. 7 is a greatly enlarged perspective view of a portion of the irradiating apparatus as shown in FIG. 4 illustrating the arrangement of the plurality of paths for the advancing strand according to the invention.
Figure 8:
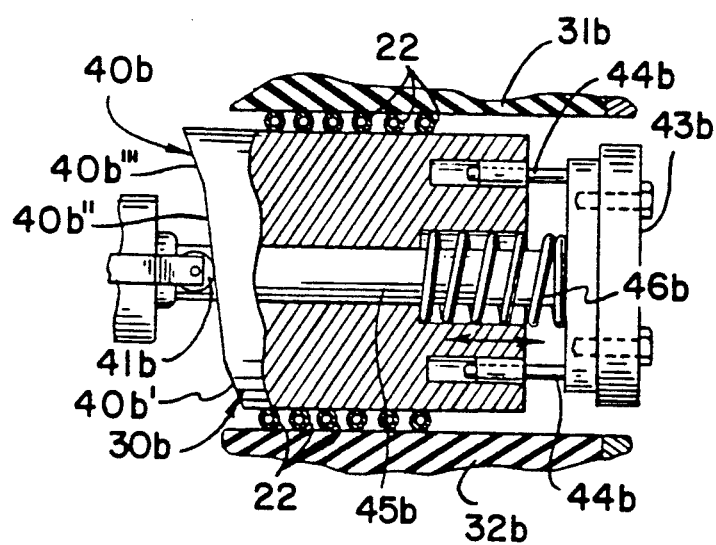
FIG. 8 is a side elevational view, partially in section, taken along lines 8—8 of FIG. 7 illustrating a medial roll according to the invention.

As shown in FIGS. 7 and 8, an end of the medial roll 30b adjacent the frame 29b includes a cammed surface 40b having a predetermined shape as more fully described below. The cammed surface 40b cooperates with an associated cam follower 41b carried by the frame 29b to thereby provide oscillating means to drive the medial roll 30b in alternating first and second axial directions relative to the respective upper pressure roll 31b and lower pressure roll 32b. The medial rolls 30a, 30b are driven 180° out of phase from each other by synchronizing means, such as a drive chain 40 connected to an electric motor, not shown. Accordingly, a high degree of twist can be imparted to the advancing strand 22.

Another aspect of the present invention is twist release means provided to release twist on the advancing strand 22 at predetermined points of maximum twist excursion. Referring to FIGS. 4 and 7, each medial roll 30a, 30b includes an oval shaped lift cam 43a, 43b, respectively, formed of two symmetrical halves which contact the upper and lower pinch rolls 31a, 32a and 31b, 32b twice during each full rotation force the rolls further apart and thereby release the twist on the strand. Moreover, the twist is released as each medial roll is at its extreme axial positions. In other words, the strand is allowed to return to its neutral, untwisted, state during extremes of the twisting thereby producing the greatest twisting exposure for a given cam action. The release of twist also prevents skid accumulation and slack accumulation in the strand. The amount of lift should be sufficient to clear the pinch roll off the strand to permit the strand to return to its neutral state, yet should minimize the unpinched time. It has been found that the lift cams preferably produce approximately 20° out of 360° of unpinched time or about 5% of unpinched time.

As shown best in FIG. 4, the lift cam 43b is fixedly secured to the shaft 45b of the medial roll 30b and is rotated by the drive chain 40 (FIG. 6). The lift cam 43b includes a pair of pins 44b operatively connected thereto and received within respective pin guides of the medial roll 30b for rotating the medial roll. The medial roll 30b is spring biased toward the cam follower 41b by a spring 46b mounted around the shaft 45b between the medial roll 30b and the lift cam 43b. As would be readily understood by those skilled in the art, other arrangements for driving the medial rolls and providing periodic twist release are also contemplated by the present invention and may include pneumatic, hydraulic, or magnetic actuators instead of the mechanical cam arrangement illustrated.

Figure 9B:
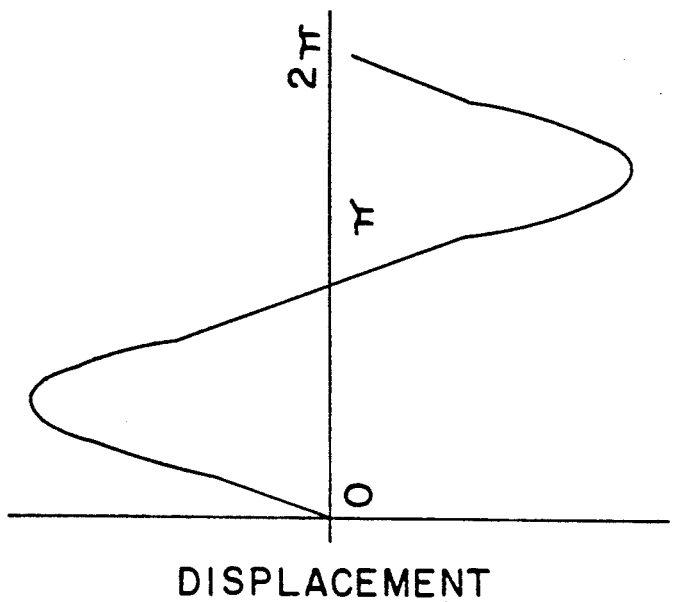
FIG. 9A and 9B are a side view of a cam surface of the medial roll of FIG. 8 and a corresponding graphical representation of the approximate triangular movement of the strand produced thereby, respectively.
Figure 9A:
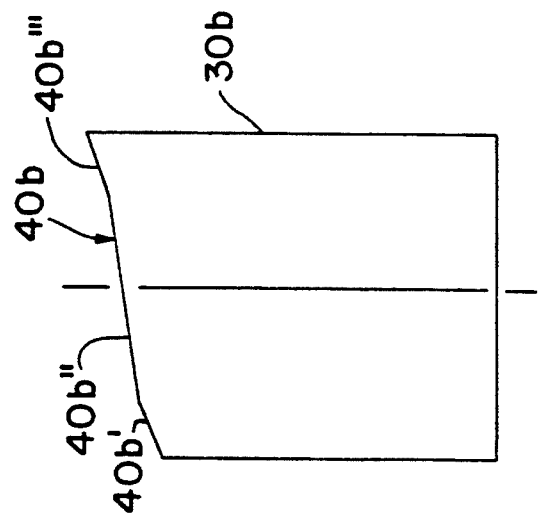

Referring to FIGS. 8, 9a and 9b, the cammed surface 40b of the medial roll and its effect in obtaining good circumferential dose uniformity will be further explained. FIGS. 9a and 9b show a sideview of the medial roll 30b and the cammed surface 40b thereon along with a graphical representation of the amount of twist versus rotation as the medial roll 30b completes a full rotation. The cammed surface 40b includes three adjacent surface areas 40b', 40b" and 40b''' which produce the approximated triangular waveform of twist versus rotation as shown in FIG. 9b. It has been found that for a typical medial roll having a 2.75 inch diameter, that the central surface area 40b" is preferably about 1.75 inches in width and sloped at 8°, while the two outer surfaces 40b, 40b''' are each 0.5 inches in width and sloped at 16°.

The approximated triangular waveform provides an almost linear rotational displacement versus time profile for the strand while permitting the cornered surface 40b to be formed from the relatively easy to fabricate flat surfaces 40b', 40b" and 40b'''. In other words, the approximately triangular waveform provides a substantially constant velocity for the strand in each direction. The amount of twist imparted to the strand 22 by the axial movement of the medial rolls should produce about 60°-90° of strand rotation. A simple sine motion, in contrast, was found to produce unacceptable dose uniformity. For sinusoidal motion, about 90% of the transverse motion (approximately linear) occurs within 120° of each 180° of rotation. Thus, for each 360° ($2\pi$ radians) of rotation, 120° are not useful for strand twisting. In other words, during ⅓ of the time, very little twisting occurs. The approximated triangular waveform of the present invention overcomes the limitations of a sinusoidal waveform using easy to fabricate flat surface segments 40b', 40b" and 40b''' on the medial roll 30b.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for irradiating a strand, said apparatus comprising:

beam generator means for generating a radiation beam; and strand advancing means for advancing such a strand along a predetermined path of travel transverse to the radiation beam, said strand advancing means including twister means for twisting the advancing strand in alternating first and second opposite rotational directions as the strand is exposed to the radiation beam to increase the circumferential dose uniformity of the irradiated strand.

2. An apparatus according to claim 1 wherein said twister means includes means for twisting the advancing strand in substantially equal alternating said first and second opposite rotational directions.

3. An apparatus according to claim 1 wherein said twister means includes twist release means for periodically releasing twist on the strand.

4. An apparatus according to claim 1 wherein said strand advancing means comprises a pair of pinch rolls for engaging the strand, and drive means operatively connected to said pair of pinch rolls for rotating said rolls to advance the strand along the predetermined path of travel.

5. An apparatus according to claim 4 wherein said twister means includes oscillating means for moving a first pinch roll of said pair pinch rolls relative to a second pinch roll of said pair pinch rolls in alternating first and second opposite axial directions to thereby twist the strand engaged between said pair of pinch rolls.

6. An apparatus according to claim 5 wherein said oscillating means comprises the first pinch roll having a cammed surface on an end thereof, and a cam follower carried by a frame and positioned adjacent said cammed surface cooperating therewith to move the first pinch roll in alternating said first and second opposite axial directions.

7. An apparatus according to claim 6 wherein said cammed surface of the first pinch roll has a predetermined shape to produce an approximate linear rotational displacement versus exposure time profile for the strand.

8. An apparatus according to claim 5 further comprising twist release means for periodically releasing twist on the strand, and wherein said twist release means comprises a lift cam operatively connected to the first pinch roll for periodically moving said pair of pinch rolls further apart to thereby release twist on the strand.

9. An apparatus according to claim 8 wherein said twist release means includes means for releasing twist on the strand at respective maximum twist excursions of the strand as said twister means alternates between said first and second opposite rotational directions.

10. An apparatus according to claim 1 wherein said beam generator means comprises an electron beam generator for generating an electron beam and scanning means associated therewith for scanning the electron beam over a portion of the strand as the strand is advanced along the predetermined path of travel.

11. An apparatus according to claim 1 wherein said strand advancing means includes take-up means for taking-up the thus irradiated strand downstream from said radiation beam.

12. An apparatus according to claim 1 wherein said strand advancing means further comprises three spaced apart idler rolls defining a tandem figure-eight pattern in side view for the strand to compensate for reel set in the strand.

13. An apparatus for irradiating a strand, said apparatus comprising:
   beam generator means for generating a radiation beam; and
   strand advancing means for advancing such a strand transverse to the radiation beam, said strand advancing means comprising
      guide means for guiding the advancing strand in a plurality of predetermined paths transverse to the radiation beam, and
      twister means for twisting the advancing strand in alternating first and second opposite rotational directions as the strand is exposed to the radiation beam to increase the circumferential dose uniformity of the irradiated strand.

14. An apparatus according to claim 13 wherein said twister means includes means for twisting the advancing strand in substantially equal alternating said first and second opposite rotational directions 15. An apparatus according to claim 13 wherein said twister means includes twist release means for periodically releasing twist on the strand.

16. An apparatus according to claim 13 wherein said strand advancing means comprises:
   first and second sets of pinch rolls positioned adjacent respectively opposite the radiation beam of said beam generator means, each said set of pinch rolls comprising a medial roll and an upper pressure roll and a lower pressure roll adjacent to said medial roll thereby defining respective upper and lower pinch point areas for engaging the strand; and
   drive means connected to each said medial roll of said first and second sets of pinch rolls for rotating said rolls to advance the strand along the plurality of predetermined paths of travel.

17. An apparatus according to claim 16 wherein said twister means includes oscillating means for moving each medial roll of said first and second sets of pinch rolls in alternating axial directions relative to respective upper and lower pressure rolls to thereby twist the strand engaged at said upper and lower pinch point areas.

18. An apparatus according to claim 17 wherein said oscillating means comprises each said medial roll of said first and second sets of pinch rolls having a respective cammed surface on an end thereof and respective cam followers cooperating with said cammed surfaces to move each said medial roll in alternating said axial directions.

19. An apparatus according to claim 18 wherein the respective cammed surface of each said medial roll has a predetermined shape to produce an approximate linear rotational displacement versus exposure time profile for the strand.

20. An apparatus according to claim 17 wherein said strand advancing means further comprises synchronizing means for synchronizing the alternating axial movement of each of said medial rolls so that said medial rolls move 180 degrees out of phase from each other.

21. An apparatus according to claim 16 further comprising twist release means for periodically releasing twist on the strand, and wherein said twist release means comprises a respective lift cam operatively connected to each medial roll of said first and second sets of pinch rolls for periodically moving the respective upper and lower pressure rolls further apart from each medial roll to thereby release twist on the strand.

22. An apparatus according to claim 21 wherein said twist release means includes means for releasing twist on the strand at respective maximum excursions of the strand as said twister means alternates between said first and second opposite rotational directions.

23. An apparatus according to claim 16 wherein said guide means further comprises a comb-like guide including a series of spaced apart channels therein positioned adjacent each of said first and second sets of pinch rolls for guiding the strand in said plurality of predetermined paths.

24. An apparatus according to claim 13 wherein said beam generator means comprises an electron beam generator for generating an electron beam and scanning means associated therewith for scanning the electron beam over portions of the strand as the strand is advanced along the predetermined paths of travel.

25. An apparatus according to claim 13 wherein said strand advancing means further comprises take-up means for taking-up the thus irradiated strand downstream from said radiation beam.

26. An apparatus for irradiating a strand, said apparatus comprising:
   beam generator means for generating a radiation beam; and
   strand advancing means for advancing such a strand transverse to the radiation beam, said strand advancing means comprising
      guide means for guiding the advancing strand in a plurality of side-by-side predetermined paths transverse to the radiation beam, said guide means comprising three spaced apart idler rolls defining a tandem figure-eight pattern in side view for the strand, and
      twister means for alternately twisting the strand in first and second opposite rotational directions as the strand is advanced along the predetermined paths and exposed to the radiation beam to increase the circumferential dose uniformity of the irradiated strand.

27. An apparatus according to claim 26 wherein said twister means includes means for twisting the advancing strand in substantially equal alternating said first and second opposite rotational directions 28. An apparatus according to claim 26 wherein said twister means includes twist release means for periodically releasing twist on the strand.

29. An apparatus according to claim 26 wherein said strand advancing means comprises:
   first and second sets of pinch rolls positioned adjacent respectively opposite the radiation beam of said beam generator means, each said set of pinch rolls comprising a medial roll and an upper pressure roll and a lower pinch roll adjacent to said medial roll thereby defining respective upper and lower pinch point areas for engaging the strand; and
   drive means connected to each said medial roll of said first and second sets of pinch rolls for rotating said rolls to advance the strand along the plurality of predetermined paths of travel.

30. An apparatus according to claim 29 wherein said twister means includes oscillating means for moving each medial roll of said first and second sets of pinch rolls in alternating axial directions relative to respective upper and lower pressure rolls to thereby twist the strand engaged at said upper and lower pinch areas.

31. An apparatus according to claim 30 wherein said oscillating means comprises each said medial roll of said first and second sets pinch rolls having a respective cammed surface on an end thereof and respective cam followers cooperating with said cammed surfaces to move each said medial roll in alternating said axial directions.

32. An apparatus according to claim 31 wherein the respective cammed surface of each said medial roll has a predetermined shape to produce an approximate linear rotational displacement versus time profile for the strand.

33. An apparatus according to claim 29 wherein said strand advancing means further comprises synchronizing means for synchronizing the alternating axial movement of each of said medial rolls so that said medial rolls move 180 degrees out of phase from each other.

34. An apparatus according to claim 29 further comprising twist release means for periodically releasing twist on the strand, and wherein said twist release means comprises a respective lift cam operatively connected to each said medial roll of said first and second sets of pinch rolls for periodically moving the respective upper and lower pressure rolls further apart from each said medial roll to thereby release twist on the strand.

35. An apparatus according to claim 34 wherein said twist release means includes means for releasing twist on the strand at respective maximum excursions of the strand as said twister means alternates between said first and second opposite rotational directions.

36. An apparatus according to claim 26 wherein said guide means further comprises a comb-like guide including a series of spaced apart channels therein positioned adjacent each of said first and second sets of pinch rolls for guiding the strand in said plurality of predetermined paths.

37. An apparatus according to claim 26 wherein said beam generator means comprises an electron beam generator for generating an electron beam and scanning means associated therewith for scanning the electron beam over portions of the strand as the strand is advanced along the predetermined paths of travel.

38. An apparatus according to claim 26 wherein said strand advancing means further comprises take-up means for taking-up the thus irradiated strand downstream from said radiation beam.

39. A method for irradiating a strand, said method comprising the steps of:
generating a radiation beam; and
advancing such a strand along a predetermined path of travel transverse to the radiation beam while twisting the advancing strand in alternating first and second opposite rotational directions as the strand is exposed to the radiation beam to increase the circumferential dose uniformity of the irradiated strand.

40. A method according to claim 39 wherein the step of twisting the strand comprises the step of twisting the strand in substantially equal alternating said first and second opposite rotational directions.

41. A method according to claim 39 further comprising the step of periodically releasing twist on the strand.

42. A method according to claim 41 wherein the step of periodically releasing twist on the strand comprises the step of releasing twist on the strand at respective maximum twist excursions of the strand between said first and second opposite rotational directions.

43. A method according to claim 39 wherein the step of advancing the strand comprises the step of guiding the advancing strand in a plurality of predetermined paths transverse to the radiation beam.

44. A method according to claim 43 wherein the step of guiding the advancing strand further comprises the step of guiding the strand in a tandem figure-eight pattern in side view to compensate for reel set in the strand.

45. A method according to claim 39 further comprising the step of scanning the radiation beam transverse to the predetermined path of travel of the strand.

46. A method according to claim 39 wherein the step of twisting the advancing strand comprises the step of twisting the strand to produce a desired exposure time to the radiation beam for predetermined circumferential portions of the strand.

47. A method according to claim 39 further comprising the step of taking-up the thus irradiated strand downstream from the radiation beam.

48. A method for making a strand having differentially irradiating radial cross-sectional portions, said method comprising the steps of:
generating a radiation beam; and
advancing such a strand along a predetermined path of travel transverse to the radiation beam, while twisting the advancing strand in alternating first and second opposite rotational directions as the strand is exposed to the radiation beam, and while controlling the radiation dosage imparted to the advancing strand to produce the strand having differentially irradiated radial cross-sectional portions.

49. A method according to claim 48 wherein the step of twisting the strand comprises the step of twisting the strand in substantially equal alternating said first and second opposite rotational directions.

50. A method according to claim 48 further comprising the step of periodically releasing twist on the strand.

51. A method according to claim 50 wherein the step of periodically releasing twist on the strand comprises the step of releasing twist on the strand at respective maximum twist excursions of the strand between said first and second opposite rotational directions.

52. A method according to claim 48 wherein the step of advancing the strand comprises the step of guiding the advancing strand in a plurality of predetermined paths transverse to the radiation beam.

53. A method according to claim 52 wherein the step of guiding the advancing strand further comprises the step of guiding the strand in a tandem figure-eight pattern in side view to compensate for reel set in the strand.

54. A method according to claim 48 further comprises the step of scanning the radiation beam transverse to the predetermined path of travel of the strand.

55. A method according to claim 48 further comprising the step of taking-up the thus irradiated strand downstream from the radiation beam.

* * * * *